N. W. AKIMOFF.
METHOD OF AND APPARATUS FOR TESTING FOR DYNAMIC BALANCES.
APPLICATION FILED JULY 20, 1917.
1,343,954.
Patented June 22, 1920.
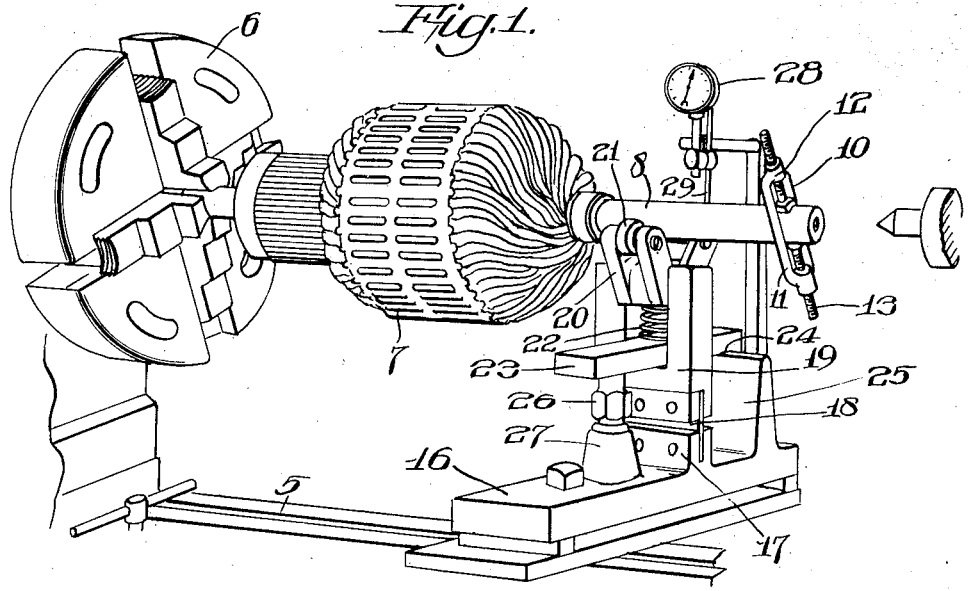
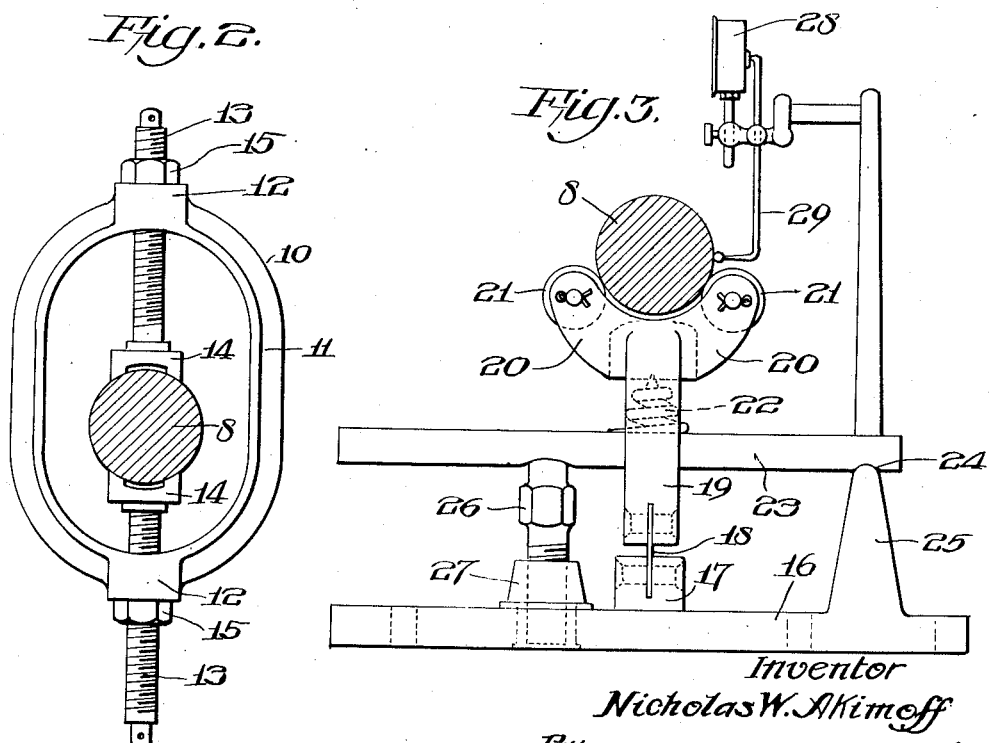

UNITED STATES PATENT OFFICE.

NICHOLAS W. AKIMOFF, OF PHILADELPHIA, PENNSYLVANIA, ASSIGNOR TO VIBRATION SPECIALTY COMPANY, A CORPORATION OF DELAWARE.

METHOD OF AND APPARATUS FOR TESTING FOR DYNAMIC BALANCES.

1,343,954.

Specification of Letters Patent.  Patented June 22, 1920.

Application filed July 20, 1917.  Serial No. 181,714.

*To all whom it may concern:*

Be it known that I, NICHOLAS W. AKIMOFF, a citizen or subject of the constituted government of Russia, (but who has declared his intention of becoming a citizen of the United States,) residing at Philadelphia, in the county of Philadelphia and State of Pennsylvania, have invented certain new and useful Improvements in Methods of and Apparatus for Testing for Dynamic Balances, of which the following is a specification.

My invention relates to a method of and apparatus for testing for dynamic balance, that is to say for rationally and accurately ascertaining the necessary changes to be made in rotatable machine elements to correct the same for improper distribution of the mass thereof which causes chatter and vibration notwithstanding said machine elements may be statically balanced about their respective axes of rotation.

It is well known that a rotatable machine element may be in such nearly perfect static balance that it will remain stationary in any angular position when the shaft thereof is placed on horizontal knife edges, but when the element so balanced is in actual operation it may chatter or vibrate on account of inequalities in the supposedly symmetrical distribution of the mass.

It can be demonstrated that in a statically balanced body, that is one whose center of gravity is on its axis of rotation, dynamic unbalance can be due only to the presence of a centrifugal couple acting in a plane through the axis of rotation which will be the resultant of all inequalities existing in the otherwise symmetrical distribution of the mass.

The object of my present invention is to provide a simple and inexpensive, yet efficient method and apparatus for accurately determining the value and location of such a disturbing centrifugal couple in rotatable machine elements or parts.

The nature and characteristic features of my invention will be more readily understood from the following description taken in connection with the accompanying drawings forming part hereof, in which—

Figure 1 is a perspective view of a portion of a lathe with fixtures attached thereto for carrying out my invention, a dynamo armature being shown mounted in operative position to be tested for any existing dynamic unbalance;

Fig. 2 is a side elevation of a portion of the apparatus which is employed to create and indicate a balancing force necessary to overcome the dynamic unbalance of the body to be tested; and Fig. 3 is a side elevation of another portion of the apparatus which is adapted to support the free end of the shaft of the rotatable body against vertical movement while serving to accentuate the vibration thereof laterally to thereby render the dynamic unbalance more perceptible.

Referring to the drawings: 5 is the bed or frame of a lathe of any ordinary type and 6 is the chuck thereof. 7 is the machine element, in this instance a dynamo armature, to be tested for any existing dynamic unbalance therein and 8 is the shaft of the armature, one end of which is mounted in the chuck 6 of the lathe and is adapted to be rotated thereby.

Upon the outer free end of the shaft 8 there is mounted a balancing appliance 10 which is shown in side elevation in Fig. 2 of the drawings and which consists primarily of a body of desired or predetermined mass preferably in the form of an elliptical frame or yoke 11 which is symmetrical about the two axes at right angles to the axis of rotation. At each end of the frame there is provided a boss or lug 12 interiorly threaded for the mounting of oppositely disposed set screws 13. The set screws 13 are of the same shape and size and each is provided at its inner end with a saddle block 14 for engaging the surface of the shaft 8, and suitable lock nuts 15 may also be provided, one for each set screw 13, outside the respective lugs 12 of the frame or yoke 11.

All the parts of the balancing appliance 10 are accurately made, calibrated, and balanced, so that when the appliance is centrally adjusted upon the shaft there will be no centrifugal effect when the shaft is rotated. By adjusting the set screws 13 the center of gravity of the frame 11 may be thereby shifted to any desired distance from the center of the shaft to thus create a centrifugal force which will correspond to the mass of the frame 11 multiplied by the radius of the displacement multiplied by the square of the angular speed.

The free end of the shaft 8 is also supported against vertical movement, but in such manner as to permit the same to oscillate, without damping, transversely to the axis thereof, by means of the device shown in side elevation in Fig. 3 of the drawings, which device is also provided with means whereby the periodicity of pendular like oscillation of the support may be adjusted to bring the same into resonance or synchronism with the rotation of the shaft, and in this manner considerably increasing the amplitude of vibration so that the same may be more readily observed.

The device shown in Fig. 3, for the purpose above set forth, may comprise a base plate 16 which is adapted to be bolted or otherwise secured to the bed of the lathe. Extending upwardly from the base plate 16 is a centrally disposed lug or projection 17 upon which there is rigidly mounted one end of a plate spring 18 which projects upwardly therefrom. The upper free end of the plate spring 18 is secured in and carries a frame or yoke 19 the upper end of which is provided with extending arms 20 in which are mounted stock type ball or roller bearings 21. The shaft 8 rests upon and is supported by the peripheries of the ball or roller bearings 21. It will be noted that the frame or yoke 19 and its associated parts as above described would have a fixed rate or periodicity of free pendular oscillation which of course would not at all times harmonize with the vibration of the body under examination and in order to synchronize the same the hereinafter described parts may be provided.

The frame or yoke 19 may have a central opening in which is disposed a cone shaped coil compression spring 22, one end of which is seated against a portion of the frame 19, and the other end of which is seated against one face of a lever 23. One end of the lever 23 is pivotally supported as at 24 on a projection 25 which extends upwardly from the base plate 16, and the other end of the lever 23 is adjustably supported by means of a stud 26 which is threaded in a bushing 27 mounted in the base plate 16. By this arrangement the degree of compression of the spring 22 may be varied at will during rotation of the shaft 16 to thereby adjust and synchronize the pendular like periodicity of free lateral oscillation of the upper end of the frame 19 and its associated parts.

For the purpose of indicating the extent of the lateral vibration there may be provided a dial gage 28 of any preferred construction having a feeler arm 29, the lower end of which is brought to bear against the surface of shaft 8 near the free end thereof. It should be understood however that the only purpose of the gage 28 is to assist in the trial location and adjustment of the balancing appliance 10, as well as the adjustment of the tension of synchronizing spring 22 of supporting bearing, by indicating the approach to and arrival at the proper adjustment.

The method and the operation of the apparatus can now be readily understood. After the machine element to be tested is statically balanced in any suitable manner it is then desirable to ascertain its dynamic unbalance, and the extent thereof, whereby the same may be corrected. The machine element is arranged as shown in Fig. 1, with the balancing appliance arranged as shown, and then by trial adjustment the operator may determine the proper angular position and radial shift as well as a desirable longitudinal location on the shaft 8 until lateral vibration of the end of the shaft which is supported on the pendular like portion of the bearing is eliminated, said bearing being adjusted as hereinbefore described to accentuate the amplitude of the vibration. By measuring the relative projection of the two set screws 13, the extent of displacement of the frame 11 may be ascertained, and the value of the centrifugal force for a certain unit speed may be determined, and by multiplying the value thus obtained by the distance of the balancing appliance from the fixed point of attachment of the shaft 8 in the chuck there is thus determined the value of a balancing couple which is required to correct the inequality in the distribution of the mass of the machine element under examination and from this value the amount and location of the correcting changes required may be readily determined.

It will thus be seen that there is provided a simple and efficient method and apparatus whereby the dynamic unbalance of a machine element may be counterbalanced for the purpose of determining the amount and location of correcting changes required, and that this value may be ascertained in functions of a single linear dimension, to wit, the amount of off center adjustment of the center of gravity of the balancing appliance 10 which is indicated by the difference in the extent of projection of the ends of the set screws 13. When the value of the balancing couple is thus determined, the skilled mechanic can then readily determine the extent and location of the drilling or added weights required to bring the machine element to a condition of dynamic balance.

Having thus described my invention what I claim as new and desire to secure by Letters Patent is

1. The method of testing a rotatable machine element for dynamic unbalance after the same has been statically balanced which consists in mounting on the shaft of said machine element a counterbalancing weight and measurably adjusting the angular, radial and longitudinal position of said weight with reference to the shaft until lateral vibration is eliminated during rotation to thereby ascertain the location and value of the disturbing centrifugal couple existing in said machine element.

2. The method of testing a rotatable machine element for dynamic unbalance after the same has been statically balanced which consists in mounting said machine element in a rotating machine with one end substantially fixedly secured and the other end free to vibrate laterally, mounting near the free end of said shaft a counterbalancing weight, and measurably adjusting the angular, radial and longitudinal position of said weight with reference to the shaft until lateral vibration is eliminated to thereby ascertain the location and value of the disturbing centrifugal couple existing in said machine element.

3. The method of testing a rotatable machine element for dynamic unbalance after the same has been statically balanced which consists in mounting said machine element in a rotating machine with one end substantially fixedly secured and the other end supported in a vibratory support, adjusting the periodicity of oscillation of said support in synchronism with the rate of rotation, mounting near the free end of said shaft a counterbalancing weight, and measurably adjusting the angular, radial and longitudinal position of said weight with reference to the shaft until lateral vibration is eliminated to thereby ascertain the location and value of the disturbing centrifugal couple existing in said machine element.

4. Apparatus for testing a rotatable machine element for dynamic unbalance comprising in combination with means for engaging one end of the shaft of said machine element and rotating the same, of means for supporting the free end of said shaft in such manner as to permit the same to vibrate laterally, and a counterbalancing weight mounted on the free end of said shaft having securing means permitting measurable adjustment of the angular, radial and longitudinal position of said weight thereon.

5. Apparatus for testing a rotatable machine element for dynamic unbalance comprising in combination with means for engaging one end of the shaft of said machine element and rotating the same, a vibratory support for the free end of the shaft to permit the same to vibrate laterally, means for adjusting the periodicity of oscillation of said support to synchronize the same with the rate of rotation, and counterbalancing weight mounted on the free end of the shaft having securing means permitting measurable adjustment of the angular, radial and longitudinal position of said weight thereon.

6. Apparatus for testing a rotatable machine element for dynamic unbalance comprising in combination with means for engaging one end of the shaft of said machine element and rotating the same, a vibratory support for the free end of the shaft to vibrate laterally, means for adjusting the periodicity of oscillation of said support to synchronize the same with the rate of rotation, a counterbalancing weight mounted on the free end of the shaft having securing means permitting measurable adjustment of the angular, radial and longitudinal position of said weight thereon, and means for successively indicating the approach to and arrival at the point of correct adjustment.

In testimony whereof, I have hereunto signed my name.

NICHOLAS W. AKIMOFF.